United States Patent
Sharp et al.

(10) Patent No.: US 10,308,068 B2
(45) Date of Patent: Jun. 4, 2019

(54) SUSPENSION CASTER

(71) Applicant: Snap-on Incorporated, Kenosha, WI (US)

(72) Inventors: William T. Sharp, Pleasant Prairie, WI (US); David A. Doerflinger, Franksville, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 15/793,101

(22) Filed: Oct. 25, 2017

(65) Prior Publication Data

US 2018/0319215 A1    Nov. 8, 2018

Related U.S. Application Data

(60) Provisional application No. 62/500,755, filed on May 3, 2017.

(51) Int. Cl.
*B60B 33/00* (2006.01)
*B60B 33/04* (2006.01)

(52) U.S. Cl.
CPC ........ *B60B 33/045* (2013.01); *B60B 33/0021* (2013.01); *B60B 2360/30* (2013.01); *B60B 2360/50* (2013.01); *B60B 2900/131* (2013.01)

(58) Field of Classification Search
CPC .............. B60B 33/045; B60B 33/0021; B62B 2301/22; B62B 2301/20; B60G 11/22; B60G 11/225; B60G 2204/41; B60G 2300/084; B60G 7/04; A61G 2005/1078
See application file for complete search history.

(56) References Cited

U.S. PATENT DOCUMENTS

| | | | | |
|---|---|---|---|---|
| 1,745,992 A | * | 2/1930 | Herold | .................. B60B 33/045 |
| | | | | 16/44 |
| 2,442,831 A | | 6/1948 | Suttles | |
| 2,522,032 A | | 9/1950 | Gerry | |
| 2,647,277 A | | 8/1953 | Christensen | |
| 3,231,256 A | * | 1/1966 | Olson | ...................... C23F 1/02 |
| | | | | 267/141 |
| 3,518,714 A | * | 7/1970 | Hager | ..................... B60B 33/02 |
| | | | | 16/35 D |
| 3,566,433 A | | 3/1971 | Lewin | |

(Continued)

FOREIGN PATENT DOCUMENTS

| | | |
|---|---|---|
| CN | 100506576 | 7/2009 |
| TW | M267086 | 6/2005 |

OTHER PUBLICATIONS

UK Office Action for Application No. GB1803717.6, dated Aug. 22, 2018, 6 pages.

(Continued)

*Primary Examiner* — Chuck Y Mah
(74) *Attorney, Agent, or Firm* — Seyfarth Shaw LLP

(57) ABSTRACT

A caster with an elastic member that absorbs impact forces during use. The elastic member can be placed between first and second portions pivotable with respect to each other about a pin. The elastic member can absorb impact forces between the first and second portions when in use. The elastic member can further include grooves that allow portions of the elastic member adjacent the grooves to flow into the grooves during impact, further absorbing impact forces.

15 Claims, 4 Drawing Sheets

(56) References Cited

U.S. PATENT DOCUMENTS

| | | | |
|---|---|---|---|
| 3,602,465 A * | 8/1971 | Velut | B65G 27/00 248/616 |
| 4,054,964 A | 10/1977 | Kaneko | |
| 4,346,498 A | 8/1982 | Welsch et al. | |
| 4,462,138 A * | 7/1984 | Black | B60B 33/045 16/44 |
| 4,485,521 A | 12/1984 | Welsch et al. | |
| 4,559,669 A | 12/1985 | Bonzer et al. | |
| 4,649,595 A | 3/1987 | Shane | |
| 5,023,128 A * | 6/1991 | Fatool | A63B 71/081 2/267 |
| 5,394,589 A | 3/1995 | Braeger et al. | |
| 6,149,169 A * | 11/2000 | Chelgren | A61G 5/10 280/647 |
| 6,453,508 B1 | 9/2002 | Denner | |
| 6,484,359 B1 | 11/2002 | Guttmann et al. | |
| 6,532,623 B1 | 3/2003 | Watanabe | |
| 6,539,578 B1 | 4/2003 | Guttmann et al. | |
| 6,575,052 B2 | 6/2003 | Toennesland et al. | |
| 6,725,501 B2 | 4/2004 | Harris et al. | |
| 6,908,087 B2 * | 6/2005 | Wintersgill | B60B 33/0002 16/35 R |
| 7,926,145 B2 | 4/2011 | Liao | |
| 8,424,158 B2 | 4/2013 | Steenson | |
| 8,499,414 B1 | 8/2013 | LeMeur, Jr. et al. | |
| 8,839,487 B2 | 9/2014 | Plate | |
| 9,090,125 B2 | 7/2015 | Block et al. | |
| 9,527,347 B2 | 12/2016 | Spektor | |
| 2007/0257457 A1 * | 11/2007 | Dotsey | B60B 33/0002 280/47.38 |
| 2009/0205164 A1 * | 8/2009 | Larson | B60B 33/045 16/44 |
| 2013/0212834 A1 | 8/2013 | Chen | |
| 2015/0174957 A1 | 6/2015 | Brazier et al. | |

OTHER PUBLICATIONS

Australian Office Action for Application No. 2018201597, dated Dec. 20, 2018, 3 pages.

Taiwan Office Action for Application No. 107114641, dated Sep. 20, 2018, 6 pages.

Taiwan Office Action for Application No. 107114641 dated Feb. 12, 2019, 4 pages.

* cited by examiner

SUSPENSION CASTER

TECHNICAL FIELD OF THE INVENTION

The present invention relates generally to a wheel caster. More particularly, the present invention relates to a wheel caster capable of carrying a wheel and having improved suspension capabilities.

BACKGROUND OF THE INVENTION

Wheel casters are known for coupling a wheel to a structure for movement, such as a roll cabinet, chair or cart. Wheel casters include a plate that couples to the larger structure, and two base members that receive an axle to rotationally connect the wheel to the plate. The wheel is movable about the axle and rotates between the two base members.

Movable objects often move over uneven terrain. For example, a cart or roll cab may move over a shop floor that is not level or that includes interruptions in the ground, or at an outdoor job site that has uneven terrain. The cart or roll cab will then endure a less smooth movement over the terrain and may become damaged as a result and/or its contents are dislodged or disorganized. Recent movable objects have therefore implemented suspension techniques to reduce the impact when a movable object rolls over uneven terrain. Common methods include coil springs, but such devices do not adequately absorb impact forces nor do they provide for a smoother ride and are unsuitable for certain applications.

SUMMARY OF THE INVENTION

The present invention broadly comprises a caster with an elastic member that absorbs impact forces during use. In an embodiment, the elastic member can be placed between a first portion and a second portion that pivot about a pin. The elastic member can be placed between the first and second portions such that, when the first portion would otherwise push against the second portion, the elastic member will absorb the impact and provide for a smoother ride for the enclosure to which the caster is coupled. The elastic member can further include grooves that allow portions of the elastic member to flow into the groove when receiving impact to further absorb impact.

In particular, the present invention broadly includes a caster having a coupling plate, a base member adapted to hold a wheel, a first portion proximate the base member, a second portion proximate the coupling plate, and a pin coupled to the first and second portions so as to allow pivotable movement of the first and second portions about the pin. An elastic member can be positioned between the first and second portions and can include grooves defined within the elastic member.

Further disclosed is a caster including first and second portions pivotably coupled to the first portion about a pin, and an elastic member positioned between the first and second portions. The elastic member can include grooves defined within the elastic member.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE EMBODIMENTS

Figure 1:
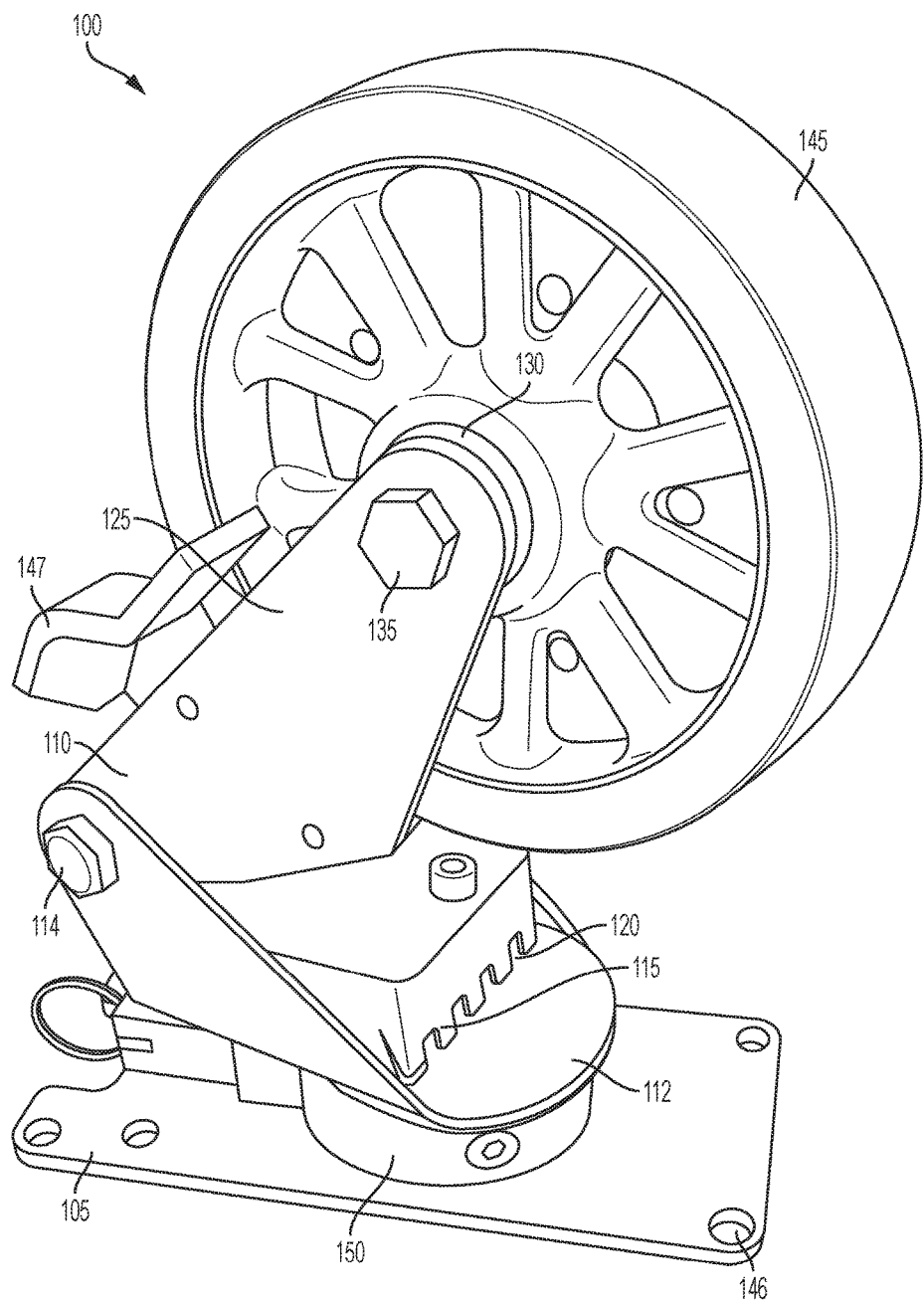
FIG. 1 is a front perspective view of caster according to at least some embodiments of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention broadly comprises a caster with an elastic member that absorbs impact forces during use. The elastic member can be placed between a first portion and a second portion that pivot about a pin and absorb impact forces between the first and second portions when in use. The elastic member can further include grooves that allow portions of the elastic member adjacent the grooves to flow into the grooves during impact, further absorbing impact forces.

Figure 2:
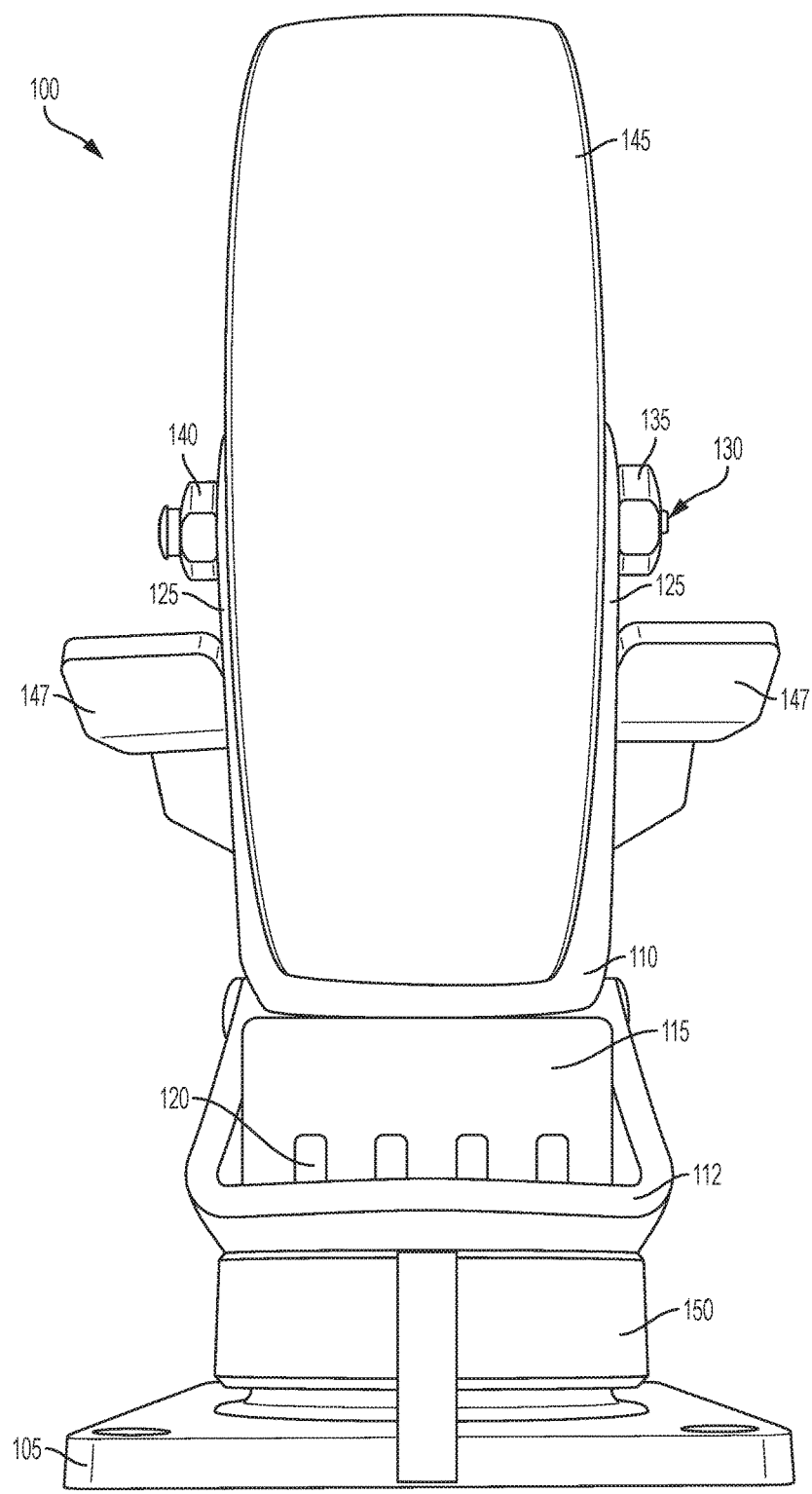
FIG. 2 is a front side view of caster according to at least some embodiments of the present invention.
Figure 3:
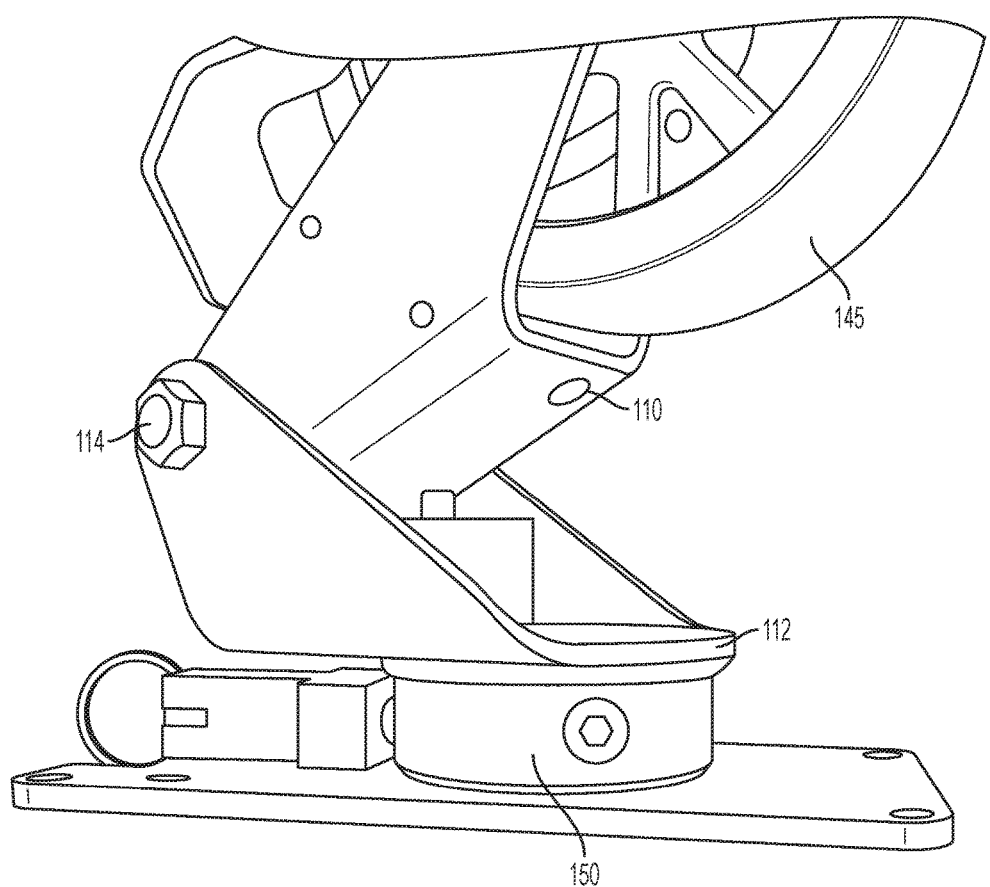
FIG. 3 is a front perspective view of caster without the elastic member according to at least some embodiments of the present invention.

Referring to FIGS. 1-3, in an embodiment, the caster 100 can include a coupling plate 105 that couples to a movable object such as a cart or roll cab. Further included are a first portion 110 and a second portion 112 pivotable about a pin 114. An elastic member 115 can be positioned between the first 110 and second 112 portions to absorb impact between the portions 110, 112 when in use. For example, the elastic member 115 can include grooves 120 that allow portions of the elastic member 115 adjacent the grooves 120 to flow into the grooves upon impact between the first 110 and second 112 portions. In doing so, the elastic member 115 can better absorb impact forces and allow a more smooth ride for a cart, roll cab, or other enclosure to which the caster 100 is coupled.

Base members 125 can be located on the bracket 110 to hold the wheel in place. For example, an axle 130, such as a bolt 135 and a nut 140 combination, can be implemented to allow the wheel 145 to rotate between the base members 125. In some embodiments, the axle 130 is an elongated rod extending between the base members 125 and allowing the wheel 145 to rotate about the axis of the axle 130.

The coupling member 105 can be any shape or size capable of coupling the bracket 110 to the movable object. In some embodiments, the coupling member 105 includes openings 146 to allow the coupling member 105 to be fastened to the movable object by fasteners, such as screws or bolts.

The caster 100 can include a brake lever 147 on either one or both sides of the wheel 145 to allow brake actuation in order to prevent the wheel 145 from rotating. For example, the brake lever 147 can include two plate-shaped objects that couple to the bracket 110 and that surround the wheel 145 on both sides. In some embodiments, the brake lever 147 can be curved or angled in such a manner as to follow the contour of the wheel 145 itself.

Referring to FIGS. 1-3, in an embodiment, the first portion 110 can be hingedly coupled to the second portion 112 about the pin 114 and can be selectively movable between two or more positions. The pin can be any tubular or rod-shaped device that allows such a configuration. The caster 100 can also include a ball bearing mechanism 150 that allows the caster 100 to swivel in various positions.

Figure 4:
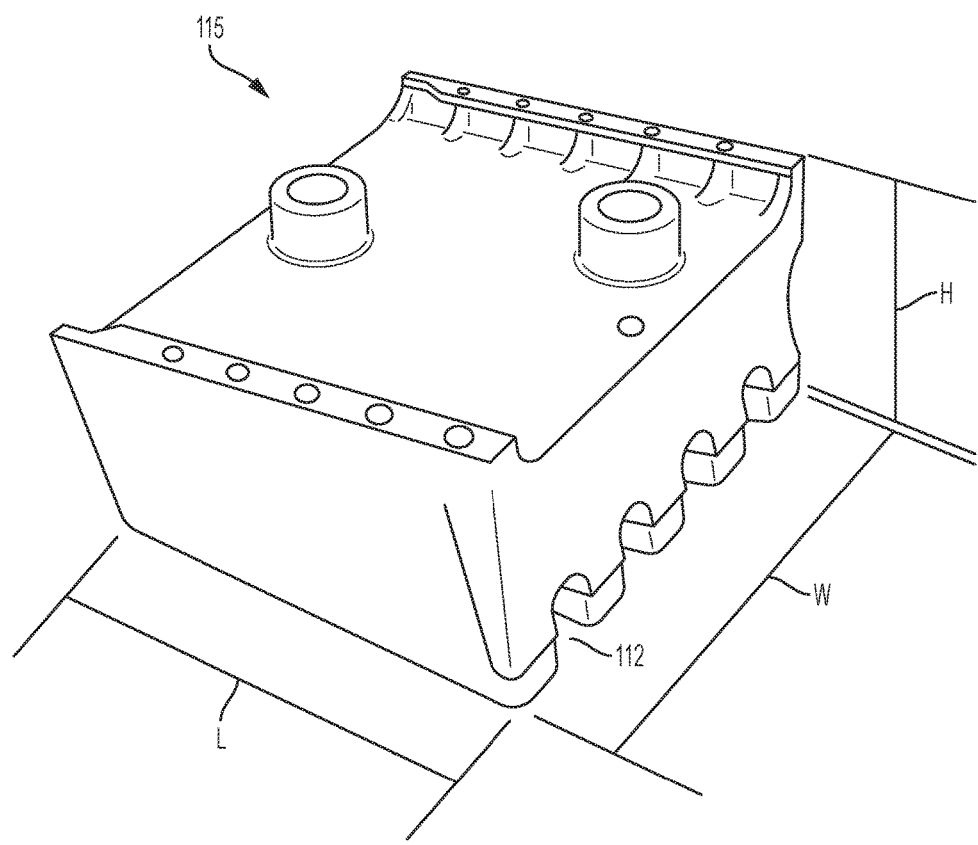
FIG. 4 is a front perspective view of an elastic member according to at least some embodiments of the present invention.

Referring to FIG. 4, in an embodiment, the elastic member 115 can be a rectangular prism-shaped object with a height H, a length L, and a width W. The elastic member can include grooves 120 that, when the caster 100 receives impact, further absorb the impact by allowing portions of the elastic member 115 adjacent or proximate the groove 120 to be pushed into the groove 120 during impact. The exact number and position of the grooves 120 is not limited, but can extend partially or entirely across the length L of the elastic member. In this manner, the elastic member 115 can receive impact perpendicular to the length L (i.e., in the direction of the height H) and allow the forces to direct portions of the elastic member 115 into the grooves 120. For example, the coupling plate 105 can extend in a plane, and the grooves 120 can extend in a direction parallel to the plane that the coupling plate 105 extends in. Such a configuration improves impact absorption and allows for a smoother ride for a cabinet, roll cab, cart, or other enclosure having the caster 100.

The elastic member 115 is discussed herein as being a rectangular prism, but the shape of the elastic member 115 is not so limited. For example, the elastic member 115 can be a rectangular prism, disk, or any other shape allowing the absorption of impact forces.

The elastic member 115 can be made of an elastomeric or rubber material, but the material of the elastic member 115 is not so limited. For example, the elastic member 115 can be Kevlar® reinforced rubber or any other material.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A caster with a wheel, the caster comprising:
    a base member adapted to hold the wheel;
    a first portion extending from the base member;
    a second portion, wherein the first and second portions are pivotably coupled to each other; and
    an elastic member disposed between the first and second portions, wherein the elastic member includes a groove defined within the elastic member and that extends along a length of the elastic member, and a recess that is contoured to receive the first portion.

2. The caster according to claim 1, further comprising a coupling plate adapted to couple the caster to an object, wherein the coupling plate extends in a plane, and the groove extends in a direction parallel to the plane.

3. The caster of claim 1, wherein the elastic member is a circular, disk-shaped member.

4. The caster of claim 1, wherein the elastic member is a rectangular, disk-shaped member.

5. The caster of claim 1, wherein the groove is adapted to allow a portion of the elastic member proximate the groove to move into the groove upon receiving an impact force at the first or second portions.

6. The caster of claim 1, further comprising a brake lever extending adjacent to the wheel.

7. The caster of claim 2, wherein the coupling plate includes openings for respectively receiving fasteners.

8. A caster with a wheel, the caster comprising:
    first and second portions pivotably coupled to each other about a pin; and
    an elastic member disposed between the first and second portions, wherein the elastic member includes a groove defined within the elastic member and that extends along a length of the elastic member, and a recess that is correspondingly contoured to receive the first portion.

9. The caster of claim 8, further comprising a coupling plate including an opening adapted to receive a fastener to couple the caster to an object.

10. The caster of claim 8, further comprising a base member extending from the first portion and that is adapted to hold the wheel.

11. The caster according to claim 9, wherein the coupling plate extends in a plane, and the groove extends in a direction parallel to the plane.

12. The caster of claim 8, wherein the elastic member is a circular, disk-shaped member.

13. The caster of claim 8, wherein the elastic member is a rectangular, disk-shaped member.

14. The caster of claim 8, wherein the groove is adapted to allow a portion of the elastic member proximate the groove to move into the groove upon receiving an impact force at the first or second portions.

15. The caster of claim 8, further comprising a brake lever extending adjacent to the wheel.

* * * * *